(12) United States Patent
Glesser et al.

(10) Patent No.: US 8,393,069 B2
(45) Date of Patent: Mar. 12, 2013

(54) WRITING INSTRUMENT WITH ROTATABLE HANDLES AND METHOD FOR MAKING THE SAME

(75) Inventors: Louis S. Glesser, Evergreen, CO (US); Eric G. Glesser, Golden, CO (US)

(73) Assignee: Spyderco, Inc., Golden, CO (US)

(*) Notice: Subject to any disclaimer, the term of this patent is extended or adjusted under 35 U.S.C. 154(b) by 1130 days.

(21) Appl. No.: 12/247,643

(22) Filed: Oct. 8, 2008

(65) Prior Publication Data

US 2009/0140456 A1 Jun. 4, 2009

Related U.S. Application Data

(63) Continuation-in-part of application No. 11/947,059, filed on Nov. 29, 2007, which is a continuation-in-part of application No. 29/317,170, filed on Apr. 23, 2008.

(51) Int. Cl.
*B21D 53/76* (2006.01)

(52) U.S. Cl. ............. 29/527.1; 29/527.3; 264/46.4; 264/46.7; 264/162; 264/242; 264/250

(58) Field of Classification Search ............... 29/527.1, 29/527.3, 527.5; 264/46.4, 46.7, 162, 242, 264/250, 255
See application file for complete search history.

(56) References Cited

U.S. PATENT DOCUMENTS

| 124,566 A | * | 3/1872 | Garrick | 30/299 |
|---|---|---|---|---|
| 3,407,021 A | * | 10/1968 | Mosch | 401/29 |
| 3,618,518 A | | 11/1971 | Rigoni | |
| 3,945,734 A | * | 3/1976 | Woodbridge | 401/198 |
| 4,067,947 A | * | 1/1978 | Miori | 264/154 |
| 4,149,812 A | | 4/1979 | Huffman, Jr. | |
| 4,261,103 A | | 4/1981 | Heck | |
| 4,330,937 A | | 5/1982 | Cope | |
| 4,364,174 A | | 12/1982 | De Asis | |
| 4,389,777 A | * | 6/1983 | Landsberger | 30/324 |

(Continued)

FOREIGN PATENT DOCUMENTS

| CN | 2335791 | 9/1999 |
|---|---|---|
| DE | 9107605 | 8/1991 |

(Continued)

OTHER PUBLICATIONS

Skipper Martin; Bizarre Pen; Mar. 24, 2007; www.ape-entertainment.com, pp. 1-5.*

(Continued)

*Primary Examiner* — Jermie Cozart
*Assistant Examiner* — Bayan Salone
(74) *Attorney, Agent, or Firm* — Sheridan Ross P.C.

(57) ABSTRACT

A writing instrument comprising a writing utensil and associated handles interconnected to each other to allow a user to selectively position the writing utensil in either an extended position of use or a closed position of storage, as well as a variety of positions there between. In an open position, the handles may be positioned adjacent one another with the writing utensil extended longitudinally away from the adjacent handles in a position of use. In a closed position, the handles may be positioned adjacent to the longitudinal length of the writing utensil, with the writing utensil at least partially enclosed between the handles in a position of storage. The rotation of the handles about the writing utensil allows a user to manipulate the handles in a variety of ways, similar to that of a "butterfly knife" or similar device comprising balisong style openings. In one aspect of the invention, the writing instrument may be used to perform moves or tricks as a novelty device to provide entertainment and enjoyment to a user. A method of manufacturing the writing instrument by injection molding is also disclosed.

10 Claims, 4 Drawing Sheets

U.S. PATENT DOCUMENTS

| | | | | |
|---|---|---|---|---|
| 4,470,327 | A * | 9/1984 | Gerber et al. | 76/104.1 |
| 4,518,273 | A * | 5/1985 | Larizza | 401/98 |
| D289,368 | S | 4/1987 | Mann | |
| 4,672,743 | A * | 6/1987 | Grahm | 30/153 |
| 4,722,140 | A * | 2/1988 | Miceli | 30/153 |
| 4,738,558 | A | 4/1988 | Hiromori | |
| 4,815,881 | A * | 3/1989 | Chern | 401/52 |
| 5,061,104 | A * | 10/1991 | Florjancic | 401/195 |
| 5,115,571 | A * | 5/1992 | Mackin | 33/558.04 |
| 5,551,141 | A * | 9/1996 | De'Ath et al. | 29/527.3 |
| 5,678,939 | A * | 10/1997 | Ross | 401/6 |
| 5,689,890 | A * | 11/1997 | Glesser | 30/340 |
| 5,694,692 | A * | 12/1997 | Reinschreiber | 30/155 |
| D389,185 | S | 1/1998 | O'Mara et al. | |
| D420,702 | S | 2/2000 | Chang | |
| 6,060,011 | A * | 5/2000 | Zandvliet et al. | 264/275 |
| 6,170,158 | B1 | 1/2001 | Daily | |
| 6,195,898 | B1 | 3/2001 | Lemisch | |
| 6,195,899 | B1 * | 3/2001 | Watanabe | 30/340 |
| 6,264,389 | B1 | 7/2001 | Ducharme | |
| 6,331,087 | B1 | 12/2001 | Wang | |
| 6,464,419 | B1 | 10/2002 | Chan | |
| 6,493,947 | B2 * | 12/2002 | Stokes | 30/341 |
| 6,595,837 | B2 * | 7/2003 | Raklovits et al. | 451/321 |
| 6,595,874 | B2 * | 7/2003 | Sullivan et al. | 473/374 |
| D487,494 | S | 3/2004 | Glesser | |
| 6,780,365 | B2 * | 8/2004 | Goldbach | 264/251 |
| 6,929,567 | B2 * | 8/2005 | Sullivan et al. | 473/374 |
| 7,056,459 | B2 * | 6/2006 | Park | 264/51 |
| D526,682 | S | 8/2006 | Ortiz et al. | |
| 7,103,947 | B2 * | 9/2006 | Sartor et al. | 29/11 |
| D534,212 | S | 12/2006 | Chan | |
| 7,452,150 | B2 | 11/2008 | Chan | |
| D602,199 | S * | 10/2009 | Ortega | D28/30 |
| 8,147,159 | B2 * | 4/2012 | Glesser et al. | 401/195 |
| 8,182,166 | B2 * | 5/2012 | Colman | 401/131 |
| 2005/0055835 | A1 * | 3/2005 | Pardue et al. | 30/340 |
| 2005/0145061 | A1 * | 7/2005 | Ording et al. | 74/594.1 |
| 2005/0217211 | A1 * | 10/2005 | Py | 53/426 |
| 2005/0223677 | A1 * | 10/2005 | Py | 53/140 |
| 2006/0073322 | A1 * | 4/2006 | Donatti et al. | 428/304.4 |
| 2006/0123634 | A1 * | 6/2006 | Peterson et al. | 30/232 |
| 2006/0196055 | A1 * | 9/2006 | Barcala | 30/129 |
| 2009/0142127 | A1 | 6/2009 | Glesser et al. | |

FOREIGN PATENT DOCUMENTS

| | | |
|---|---|---|
| FR | 2554036 | 5/1985 |
| JP | 2001-121875 | 5/2001 |

OTHER PUBLICATIONS

"Kershaw or Spyderco ?? One of a Kind ~1600 Combo Serr", eBay website, Item No. 6587650374, printed Dec. 13, 2005, pp. 1-5.

Skipper Martin et al., Ape Entertainment Forums: My strange brain and the amazing "Bizarre Pen.", Ape Entertainment Forums, available at http://www.ape-entertainment.com/cgi-bin/ultimatebb.cgi?ubb=get_topic;f=81;t=000002;p=1#000000, Mar. 24, 2007, pp. 1-5.

First Office Action (including translation) for Chinese Patent Application No. 200810178632.1, issued Apr. 7, 2011.

Official Action for U.S. Appl. No. 11/947,059, mailed Aug. 10, 2011.

Second Office Action (English translation) for Chinese Patent Application No. 200810178632.1, issued Jan. 29, 2012, 11 pages.

Third Office Action (English translation) for Chinese Patent Application No. 200810178632.1, issued Jun. 29, 2012, 9 pages.

Notice of Allowance for U.S. Appl. No. 11/947,059, mailed Nov. 25, 2011.

Bali Pen Images, http://lesvoorhiesknives.com/available/balipen.jpg, from submission of prior art under 37 CFR 1.501 in U.S. Pat. No. 8,147,159 on Sep. 10, 2012.

Fourm Couteau Papillon—Les Voorhies Bali Pen, http://www.francebalisong.com/forum/viewtopic.php?f=4&t=645, from submission of prior art under 37 CFR 1.501 in U.S. Pat. No. 8,147,159 on Sep. 10, 2012.

Les Voorhies Bali Pen, http://www.knives.pl/fourm/index.php?topic=50516.0;topicseen, from submission of prior art under 37 CFR 1.501 in U.S. Pat. No. 8,147,159 on Sep. 10, 2012.

* cited by examiner

WRITING INSTRUMENT WITH ROTATABLE HANDLES AND METHOD FOR MAKING THE SAME

CROSS-REFERENCE TO RELATED APPLICATIONS

This application is a continuation-in-part and claims the benefit of co-pending U.S. patent application Ser. No. 11/947,059, filed on Nov. 29, 2007, and further claims the benefit of U.S. design patent application Ser. No. 29/317,170, filed on Apr. 23, 2008. Both of these co-pending applications are incorporated herein in their entireties.

FIELD OF THE INVENTION

The present disclosure relates generally to writing instruments. More particularly, the disclosure relates to a writing instrument with rotatable handles for selectively storing and/or using the writing instrument, and a method for making the writing instrument.

BACKGROUND OF THE INVENTION

Writing instruments have been known in the art for a long time, in various styles and configurations, including pencils and pens, for use by an individual. As writing instruments have developed, they have taken on a variety of different designs, profiles and shapes to accommodate different writing styles, and some designs allow a writing instrument to be collapsed or stored in at least one position so that the writing instrument is protected from damage when it is not in use.

However, prior art writing instruments generally do not allow the writing utensil to be used in multiple positions respective to the handle. Furthermore, the casing or handle of these prior art devices are typically obtrusive to a user when attempting to use the writing instrument for writing. Thus, according to the present invention, a device which comprises a writing utensil rotatably attached to a pair of handles which allow the writing utensil to be selectively positioned either away from the handles in a position of use, or enclosed by the handles in a position of storage, wherein both positions allow the writing instrument to be easily grasped and/or used by a user is disclosed. Furthermore, it is also desirable to allow the writing utensil to be used when the writing utensil is positioned in either a position of storage or use relative to the handles. Further, it is also desirable to provide a writing instrument that has a secondary purpose of providing entertainment to the user, and wherein a variety of tricks and movements can be performed by rotating a plurality of handles in a variety of different positions, similar to a "butterfly" knife, such as that shown and described in U.S. Pat. No. 6,195,898, which is incorporated herein in its entirety by reference.

These and other problems are solved by the present invention, which comprises a writing instrument including a writing component rotatably connected to two handles at a common point of rotation as described in greater detail herein.

SUMMARY OF THE INVENTION

It is thus an object of the present invention to provide a writing instrument comprising a writing utensil and associated handles interconnected to each other to allow a user to selectively position the writing utensil in either an extended position of use or a closed position of storage. It is a further object of the present invention that the writing utensil and associated handles be designed to use a minimum number of components, thus making the writing instrument inexpensive to manufacture, simplistic in design, and encompassing a variety of different embodiments.

Thus, in one aspect of the present invention, a writing instrument is provided which comprises a writing utensil rotatably connected to two handles, each of the handles rotatable about a fixed point proximate to the non-writing end of the writing utensil and allowing the handles to be positioned in various ways relative to the writing utensil. In one position, the handles may be positioned adjacent one another with the writing utensil extended longitudinally away from the adjacent handles in a position of use. In another position, the handles may be positioned adjacent to the longitudinal length of the writing utensil, with the writing utensil at least partially enclosed between the handles in a position of storage. In this embodiment, the writing instrument may be used to write when the writing utensil is in either a position of use or a position of storage. In this embodiment, the writing utensil is partially exposed at the end of the writing utensil opposite the end comprising the attachment of the handles, thereby allowing the writing utensil forward end to contact a writing surface despite the body of the writing utensil being stored between the handles of the writing instrument. The writing instrument according to this embodiment may be held by a user in one of two different positions, thereby accommodating individual preferences for grasping the writing instrument.

In another aspect of the invention, the writing instrument may be used to write only when the writing utensil is in the extended position of use, and not used when the handles completely surround the writing utensil and protect the writing utensil when it is in a position of storage.

In another aspect of the invention, the writing instrument may be used to provide a source of enjoyment and entertainment to the user, wherein the rotation of the handles about the writing instrument may be used to perform a variety of manipulations, movements and tricks by quickly rotating the handles in a variety of different positions, similar to a "butterfly" knife.

In another aspect of the invention, a method for manufacturing the writing instrument described herein is disclosed, which provides several advantages for the writing instrument in several embodiments. For example, various manufacturing methods disclosed herein may be achieved by injection molding processes, and further comprise molding one or more components of a writing instrument having a substantially hollowed out portion, for inserting a replaceable ink cartridge or other component necessary for replacing the writing element of the writing utensil, such as lead, graphite, or other material. In another embodiment, a substantially hollowed out portion may be provided for inserting weights for achieving proper balancing of the writing instrument, or the weights may be overmolded during the injection molding process. In yet another embodiment, divots or depressions on the outer surfaces of the writing instrument may be molded to create a more ergonomic writing instrument.

In another embodiment, the handles and/or the writing utensil of the writing instrument may be comprised of several different materials, such as a first higher density material and second a lighter density material, to further achieve proper balancing and weight proportions in the handles and writing utensil portions of the writing instrument, or to improve the ergonomic properties of the writing instrument.

In yet another embodiment, surface features may be incorporated into the design of the writing instrument, such as contouring, texturing, or scarring to improve a user's ability to grip and control the writing instrument while writing or performing trick, flips or moves with the writing instrument. Coloring of the component parts of the writing instrument may also be accomplished prior to, during or following the injection molding process, according to one embodiment of the present invention.

Thus, in one particular aspect or embodiment of the present invention, a folding knife is provided which generally comprises:

A foldable instrument for writing comprising:
a writing utensil;
at least two handles rotatably interconnected to a first distal end of the writing utensil, the at least two handles further comprising recesses along a longitudinal length of the at least two handles for enclosing at least a portion of the writing utensil between the at least two handles in a first position;
wherein the at least two handles are independently rotatable about the first distal end of the writing utensil to allow the at least two handles to become positioned adjacent to each other in a second position with the writing utensil extended from the at least two handles in a position of use, and wherein each of said at least two handles can independently rotate around said point of interconnection at the distal end of the writing utensil.

According to another embodiment, a method of manufacturing the writing instrument is disclosed, which generally comprises the steps of:

(1) providing a mold for at least two handles which are rotatably interconnected to a distal end of the writing instrument;
(2) creating a mixture of materials;
(3) injecting the mixture of materials into the mold;
(4) sealing the mold to form the at least two handles of the writing instrument;
(5) cooling the at least two handles; and
(6) assembling the at least two handles and any other component parts to produce the writing instrument.

Other aspects of the various embodiments of the invention will become apparent after reading the Detailed Description and reviewing the appended claims.

DETAILED DESCRIPTION

Figure 1:
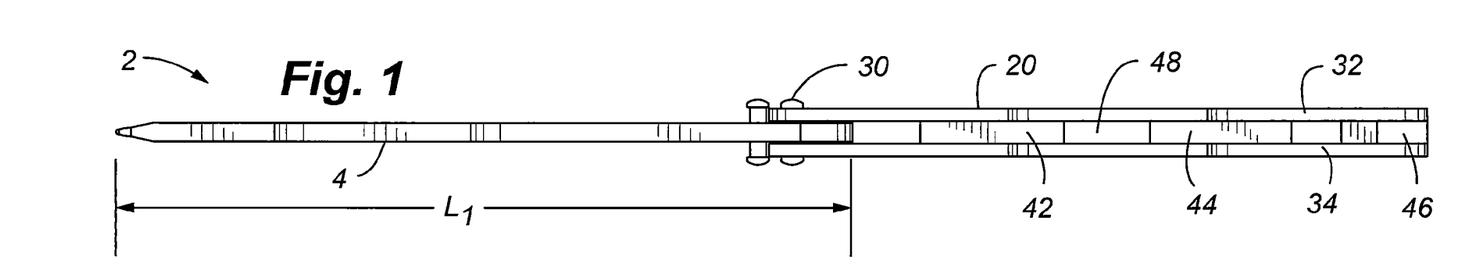
FIG. 1 is a top plan view of a writing instrument with rotatable handles shown in an open position, according to one embodiment of the invention.

As described in detail below, various embodiments of the present invention include a novel, collapsible writing instrument, comprising two handles rotatably connected to a utensil for writing, such as a pen or pencil. Referring now to the drawings, FIG. 1 represents one particular embodiment of the present invention and generally depicts a writing instrument 2 in a first open position with a writing utensil 4 available for use. In general, the writing instrument 2 comprises a writing utensil 4 rotatably connected to at least one handle portion 20. The at least one handle portion 20 is rotatable about the writing utensil 4 at writing utensil distal end 8 by a pin 30 or similar connection. The fixed point of rotation provided by pin 30 for the at least one handle portion 20 allows the rotation of the handle portion 20 about the writing utensil 4 to allow the at least one handle portion 20 to be placed adjacent to the longitudinal length L1, of the writing utensil 4 in a closed position of storage, or placed away from the writing utensil 4 so as to be generally parallel to the direction of and extending away from the writing utensil 4 in an open position of use (as depicted in FIG. 1). The at least one handle portion 20 further comprises a first portion 32 and a second portion 34, which are partially joined to one another by pin 30 and spacer elements 42, 44 and 46, and may provide a general recess 48 therebetween for receiving the writing utensil 4 when the writing instrument 2 is in a closed position of storage.

Figure 2:
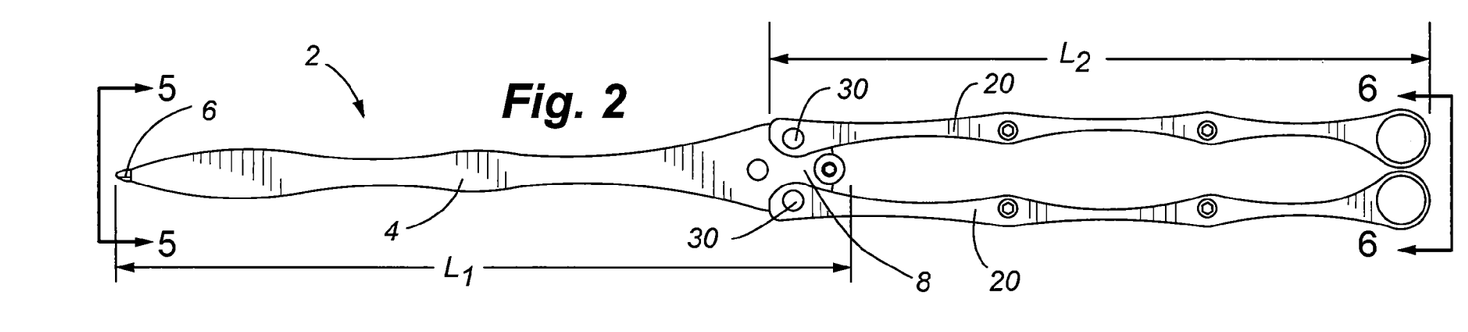
FIG. 2 is a front elevation view of the writing instrument of FIG. 1.
Figure 3:
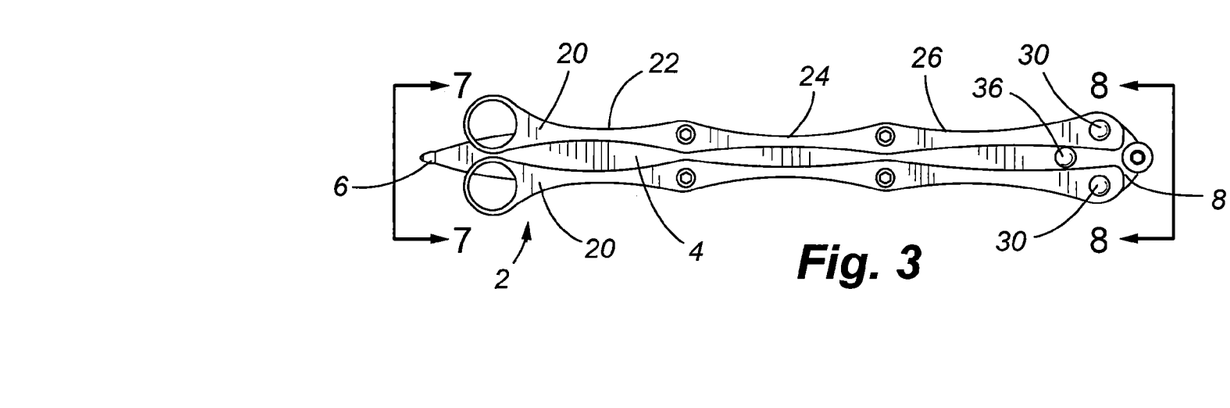
FIG. 3 is a front elevation view of the writing instrument of FIG. 1 shown in a closed position.

Referring now to FIG. 2, the writing instrument 2 in one embodiment is shown in an open position in a top plan view. According to this embodiment, the writing instrument 2 comprises two handles 20, and the longitudinal length L1 of the writing utensil 4 is substantially coincident with the longitudinal length L2 of the handle portions 20, thereby allowing the handle portions 20 to rotate about pins 30 positioned proximate to writing utensil distal end 8 and thereby enclose a substantial portion of the writing utensil 4. This geometric configuration allows the writing utensil 4 to be utilized in either an open position (as shown in FIG. 2), or a closed position (as shown in FIG. 3). Although as shown here in FIG. 2 the writing utensil 4 is slightly greater in length than the handle portions (i.e., L1>L2), in other embodiments the writing utensil 4 is fully enclosed by the handle portions 20 when the writing instrument 2 is in a closed position, as described in greater detail below.

One advantage of the ability to rotate the handles about the writing utensil is the enjoyment and entertainment a user may experience while holding the writing instrument and quickly positioning the handles in various positions and performing unique moves or tricks. This advantage is created by providing a connection between the handles and the writing utensil similar to a "butterfly knife," which has near frictionless connections between the blade and handles of the knife, and utilizes "balisong" style openings to allow the knife to be quickly and effortlessly positioned in a variety of different ways. A user may open and close the writing instrument in a variety of ways and in some instances employing a fair amount of dexterity depending on the skill of the user and their knowledge of the application of the balisong openings. Very skilled users may find enjoyment in very rapid manipulation of the handles, and may also be able to experiment with opening and deploying the writing utensil while only holding one of the handles and the other hanging free, for example.

Referring now to FIG. 3, the writing instrument 10 is shown in a front elevation view, with the two handles 20 positioned adjacent the longitudinal length of the writing utensil 4, thereby securing the writing utensil 4 within the recess of the handles 20, or otherwise in a stored or closed position. The handles 20 pivot about pins 30 and allow the handles 20 to rotate to a closed position as depicted in FIG. 3 or an open position (as depicted in FIG. 2). The writing utensil 4, according to this embodiment, is slightly longer in longitudinal length than the corresponding handles 20 when positioned in a closed position, thereby permitting a user to use the writing utensil 4 although the writing utensil 4 has been secured in a closed position. In an alternate embodiment, the handles 20 are longer in the longitudinal direction than the writing utensil 4 thereby preventing a user from utilizing the writing utensil 4 when the writing instrument 2 is in a closed position, and thereby protecting the writing utensil forward end 6 from damage when the handles 20 have been rotated to a closed position and the writing utensil 4 is secured between the handles 20.

The writing utensil 4 may be one of a variety of different styles, including but not limited to a pencil, a pen, such as a ballpoint or retractable ink pen, chalk, highlighter, felt tip or any other style of writing utensil which may be fit between two handles as described above. Furthermore, the writing utensil may be integrated with the contoured housing shown in FIG. 2 above, or may be designed to integrate with different shaped and sized housings to fit the users preferences.

Referring still to FIG. 3, the handles 20, according to one embodiment, are contoured to allow a user to grasp the writing instrument 2 at various points, depending on the user's preference and writing style. Although the handles 20 shown herein are defined shapes molded or fabricated from a rigid material, it is to be expressly understood that the handles may also comprise an additional layer for gripping of the handles by a user, such as a thermoplastic material, including but limited to rubber, plastic or other synthetic material encasing the rigid material of handles 20. As shown in FIG. 3, approximately three different contours 22, 24, 26 may be provided for grasping the writing instrument 2 with the handles 20 in a closed position. The contours provide multiple locations about the writing instrument 2 where a user may grasp a portion of the writing instrument 2 where the handles 20 narrow to a smaller dimension (taken about the minor or lateral axis of the writing instrument 2). It is to be expressly understood that fewer or greater number of contours 22, 24, 26 may be provided with handles 20 corresponding to the writing instrument 2 described herein, depending on the configuration of the handles 20 and the writing utensil 4.

Additionally, the handles 20 may further comprise latching means for fixing the handles 20 together when the writing instrument 2 is in an open or closed position. Latching means could include, by way of example but not limitation, magnetic strips located proximate to spacer element 46, with opposing polarities, thereby attracting one another when the spacer elements 46 of each handle 20 are in close proximity to one another and providing the necessary holding force to prevent the handles 20 from moving inadvertently during use of the writing instrument 2. Alternatively, the latching means could include a latch and corresponding hook, positioned on different handles 20 proximate to and one of the spacer elements 42, 44, 46, or by the use of a hook and loop materials, or by other means of interconnecting that are well known in the art. Once the latch engages the hook the handles 20 are prevent from rotating apart from one another, thereby fixing the handles in either an open or closed position. This may be accomplished when the handles are adjacent one another in either an open position or a closed position, as in either position the handles are positioned adjacent to one another, regardless of the latching means employed.

Figure 4:
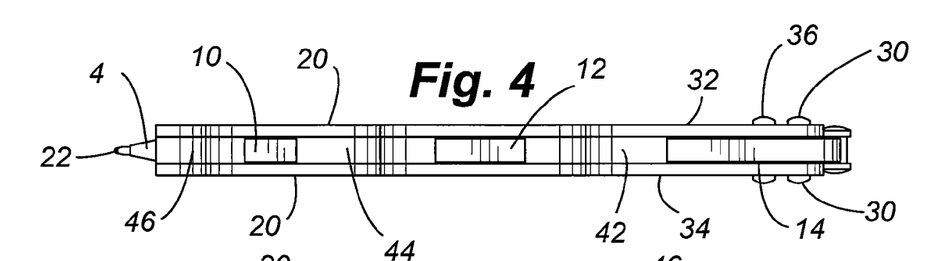
FIG. 4 is a top plan view of the writing instrument of FIG. 3.

Referring now to FIG. 4, the writing instrument 2 is shown in a closed position in, a top plan view. The writing instrument 2, according to this embodiment, provides multiple locations for a user to grasp the writing instrument 2 directly, despite being secured between the corresponding handles 20 as shown in FIG. 4. The handles 20 at least partially enclose the writing utensil 4, while allowing exposure of multiple lateral surfaces 10, 12, 14 of the writing utensil 4 to permit a user to firmly grasp the writing utensil 4 and use the writing instrument 2 although the handles 20 are positioned about the writing utensil 4. A stopping pin 36 positioned proximate to the writing utensil distal end 8 prevents the handles 20 from rotating beyond a certain point, thereby preventing undue force on the writing utensil forward end 6 when the handles 20 are in a closed position.

Figure 5:
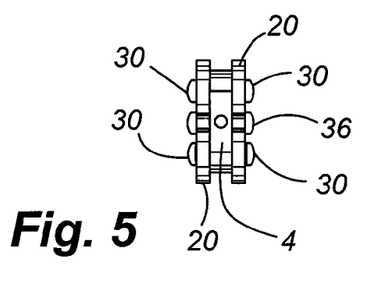
FIG. 5 is a forward elevation view of the writing instrument of FIG. 1.
Figure 6:
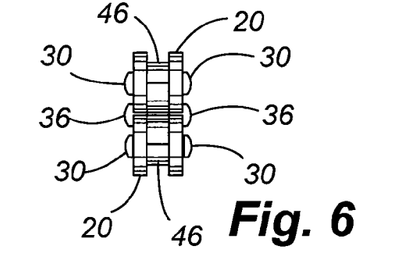
FIG. 6 is a rear elevation view of the writing instrument of FIG. 1.

Referring now to FIGS. 5 and 6, a writing instrument 2 according to one embodiment is shown in a forward elevation view and a rear elevation view with the writing instrument 2 in an open position of use. Referring specifically to FIG. 5, the writing instrument 2 extends forward in the longitudinal direction from the handles 20 which are positioned surrounding the writing utensil forward end 6 and connected thereto by pins 30 which permit the handles 20 to rotate about the writing utensil distal end 8. Referring to FIG. 6, a rear elevation view shows the ends of the handles 20 positioned adjacent to one another (viewed from the writing utensil distal end 8). This configuration permits the writing instrument 2 to be grasped either along the perimeter of the body of the writing utensil 4 or along the portion of the handles 20 that are exposed when in an open position of use.

Figure 7:
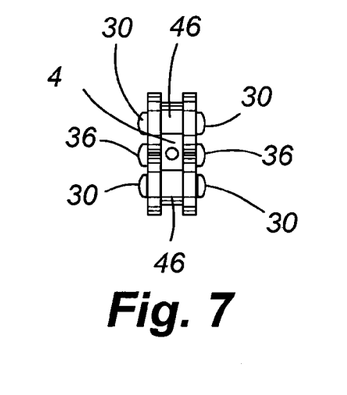
FIG. 7 is a forward elevation view of the writing instrument of FIG. 3.
Figure 8:
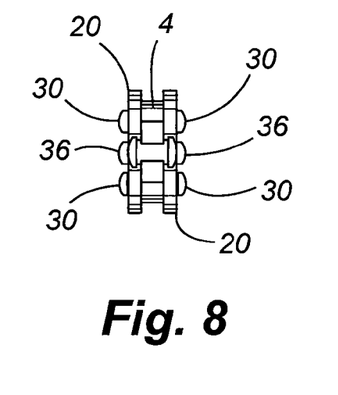
FIG. 8 is a rear elevation view of the writing instrument of FIG. 3.

Referring now to FIGS. 7 and 8, the writing instrument 2 is shown in a forward elevation view and a rear elevation view, respectively. As seen in FIG. 7, the writing utensil 4 fits securely between two recesses 48 formed by each of the corresponding handles 20, thereby preventing the writing utensil 4 from moving laterally within the body of the writing instrument 2 created by the handles 20 positioned adjacent the writing utensil 4 when the handles 20 are in a closed position.

Referring now to FIG. 8, a rear elevation view of the writing instrument 2 is shown in a closed position. Here, the handles 20 have been positioned about the writing utensil 4 so as to permit a user to store the writing instrument 2 in a pocket or sleeve or other compartment and thereby prevent the writing utensil 4 from being damaged.

Figure 9:
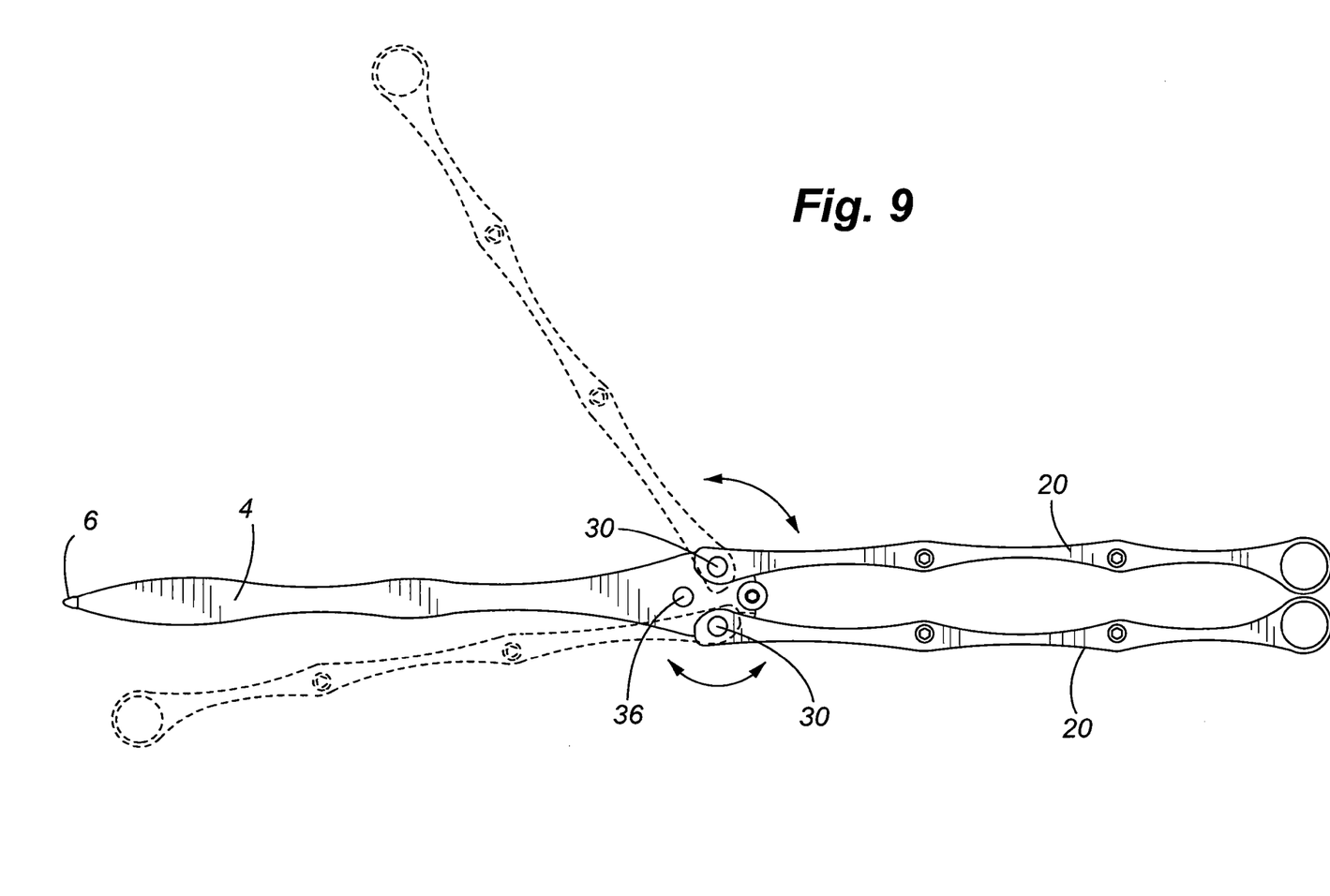
FIG. 9 is a front elevation view of the writing instrument of FIG. 1 depicting movement of the handles from an open position to a closed position.

Referring now to FIG. 9, the writing instrument 2 is shown in an open position of use with a partial image of the handles 20 being rotated about the pins 30, thereby demonstrating the action of converting the writing instrument 2 from an open position to a closed position. The handles 20 each rotate about an independent fixed point, shown here as pins 30, on the end of the writing utensil 4 opposite the writing utensil forward end 6, such that each handle 20 may rotate about the end of the writing utensil 4 and allow the writing utensil 4 to become partially enclosed between the two sides of each of the handles 20 as described in greater detail above. Although a writing instrument 2 according to the embodiment of FIG. 9 depicts the handle portions 20 slightly shorter in longitudinal dimension than the writing utensil 4, it is to be understood that the handles 20 may be longer than the writing utensil 4, thereby allowing the writing utensil 4 to become fully enclosed by the handles 20 when in a closed position.

Figures 10, 11:
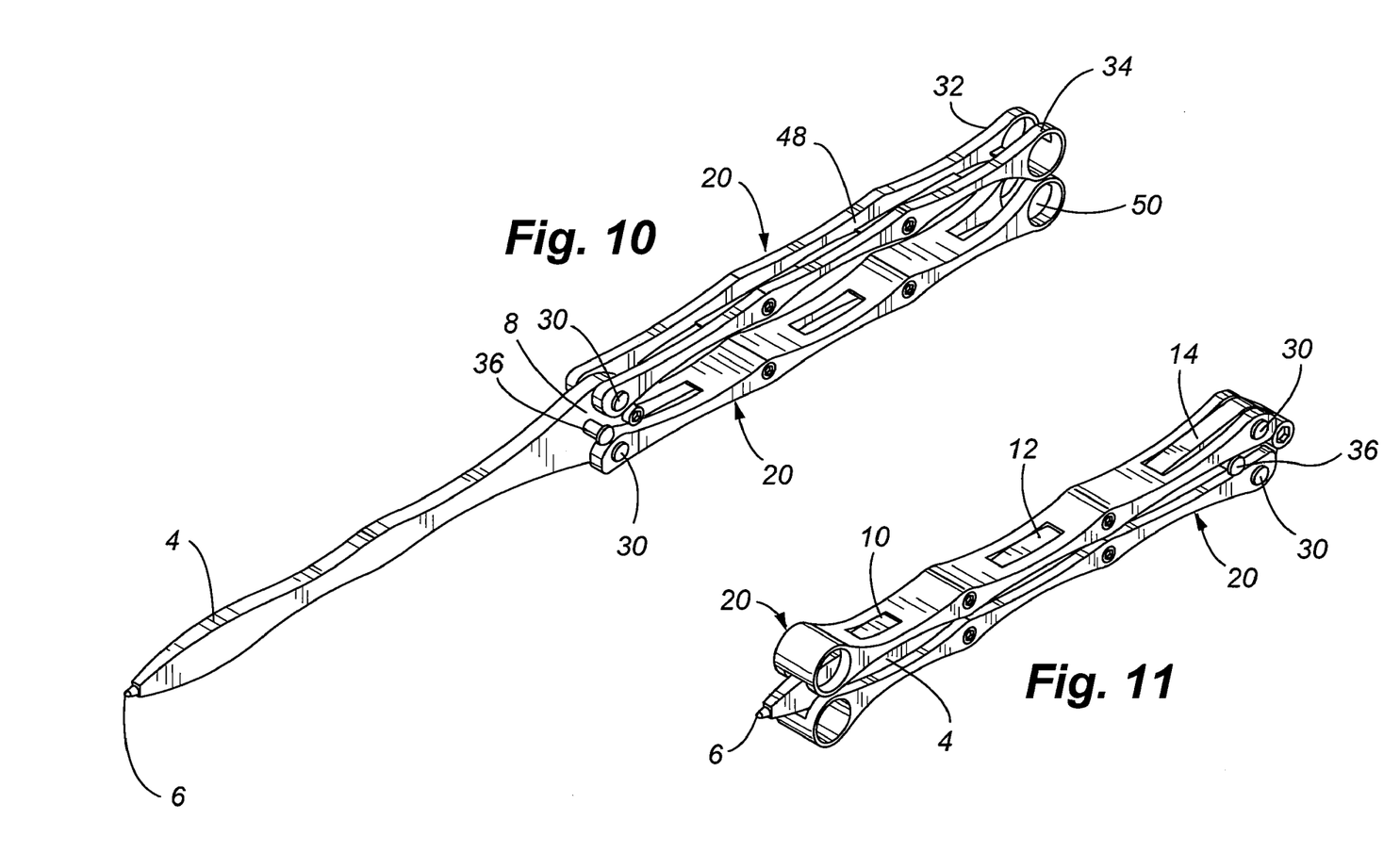
FIG. 10 is a front perspective view of the writing instrument of FIG. 1.
FIG. 11 is a front perspective view of the writing instrument of FIG. 3.

Referring now to FIG. 10, the writing instrument 2 of FIG. 1 is shown in a front perspective view. As seen here, each handle 20 is connected to the writing utensil 4 by a pin 30 or other mechanism, thus creating a pivot point by which each of the handle 20, sections may rotate or pivot independently of one another and be positioned in either an open position of use, as shown in FIG. 10, or a closed position, as shown in FIG. 11. Each handle 20 comprises a first portion 32 and a second portion 34, spaced apart from one another by spacer elements 42, 44, 46, such that each handle 20 provides a recess 48 wherein the body of the writing utensil 4 may be stored when the handles 20 are in a closed position. Furthermore, each handle 20 comprises a hole or slot 50 at the rear end of each handle 20, for securing the handle 20 to a cord, chain, strap, or other device for securing the handle 20 to another article.

Referring now to FIG. 11, the writing instrument 2 is shown with the handles 20 in a closed position, thereby at least partially enclosing the writing utensil 4 and protecting the writing utensil 4 from damage while in a stored or closed position. The lateral surfaces 10, 12, 14 permit portions of the writing utensil 4 to be exposed, such that the writing utensil 4 may be grasped directly by a user when the writing instrument 2 is in a closed position, thereby facilitating use of the writing instrument 2 despite being in a closed position.

The positioning described above in reference to FIGS. 10-11 may be advantageous for several reasons. First, it may be desired to provide a writing instrument 2 that has both a small lateral dimension when in an open position, and a larger lateral dimension when in a closed position, thereby accommodating different preferences for a user when choosing the type of writing instrument 2 to use. Second, the position of the handles 20 partially enclosing the writing instrument 2 may provide a more rigid, stable and effective writing instrument 2 than the writing instrument 2 when the handles 20 are in an open position. Third, when the handles 20 are in a closed position, this greatly reduces the overall length of the writing instrument 2, thereby permitting the writing instrument 2 to be stored in a pocket, sleeve, or other opening or container for transporting and storing the writing instrument 2 and may also assist a user in grasping the writing instrument 2 and handling the writing instrument 2 with greater dexterity. Fourth, the writing instrument 2 may be stored in a closed position and thereby allow a user to protect the writing utensil 4 from damage while being transported.

For example, a writing instrument 2 according to one embodiment may be used by a individual who works in a harsh environment, thereby exposing the writing instrument 2 to several hazards which could potentially damage the writing instrument 2 when it is not in use. Therefore, by way of example but not limitation, the writing instrument 2 according to one embodiment may be stored in a closed position, such as in a toolbox or other container, where it may come into contact with other tools or equipment, and thereby be protected from damage when the handles 20 are positioned about the writing utensil 4 and partially enclosing the writing utensil 4. In this embodiment, the handles 20 may be comprised of a more durable or anti-corrosive material than the writing utensil 4, including but not limited to steel, stainless steel, aluminum, aluminum alloy, or other type of metal. In alternate embodiments, the handles 20 may be comprised of a lighter material such as a plastic-type material, which may further be advantageous in environments where the presence of metal objects on a person poses a hazard, such as an environment where there exists the potential for an electrical field to exist. Alternatively, a combination of materials may be utilized, such as metal, metal alloy(s), wood, plastics, ceramics, compressible foams, or other materials well known in the art and that can be used in different combinations to provide a specific, weighting and balance to the handles with respect to the writing instrument.

In accordance with various other embodiments of the present invention, at least one method of manufacturing the writing instrument is herein provided, the method comprising a unique process or combination of steps. As one example, the method of manufacture may comprise an injection molding process, wherein one or more parts may be formed by injecting a moldable material, such as polyurethane or other synthetic material into a preformed mold, which incorporates the overall design on components of the writing instrument described above. It will be appreciated that different combinations and sequences for the following steps described herein may also be used for creating the writing instrument described above. According to various embodiment of the present invention, an illustrative method of manufacturing the writing utensil described above includes:

(1) providing a mold for at least two handles which are rotatably interconnected to a distal end of the writing instrument;

(2) creating a mixture of materials;

(3) injecting the mixture of materials into the mold;

(4) sealing the mold to form the at least two handles of the writing instrument;

(5) cooling the at least two handles; and (6) assembling the at least two handles and any other component parts to produce the writing instrument.

In the first step described above, molds may be formed for the desired component parts by machining a cavity into a block of rigid material, such as a metal material, in the desired shape of a component part of the writing instrument, such as the handles. According to one embodiment, the cavity in the shape of the component part may be formed by casting the mold around a "master," or sample component part. Master component parts may be constructed by machining out of the rigid material or formed from a synthetic material, or by resins.

The materials for forming the writing instrument parts may be comprised of a variety of materials, including but not limited to, polyurethane, polystyrene, polyethylene, polypropylene, ABS, or other known synthetic materials. According to the materials selected, the raw material is combined in a mixture, including, by way of example but not limitation, combinations of any of the materials listed above, and typically in a dry form, such as a powder or pellet mixture. Once the appropriate combination of materials has been mixed together in a dry state, the material is ready for preheating and ultimately injection molding into the molds.

In the third step, the material mixture is preheated to at least the gel point of the material mixture, such that the material mixture may fill evenly into every recess and cavity within the mold. The material mixture is then pressure injected into the mold and held for a specific period of time, again depending on the properties and the materials employed.

The mold is then sealed from the outside environment, including sealing of any injection apertures or openings for supplying material to the interior of the mold. After this fourth step is completed, the final step may commence.

The material in the mold is gradually allowed to cool to a temperature below the gel point of the material in the mold, thereby hardening and forming a finished composite shape. Once the material is sufficiently cooled, the component part may be removed, from the mold.

According to alternate embodiments of the present disclosure, the method of manufacturing described above may further comprise the step of sanding, shaving, or polishing the finished component part after it has been removed from the mold, to remove any excess material that may have formed during the molding process, or to provide a specific weight distribution in the handles and writing utensil.

According to yet another embodiment of the present disclosure, the method of manufacturing may further incorporate including additional elements within the mold during the injection molding process, such as weights, clips, voids and connection members such as pins, hinges and bearings. For example, weighted elements may be incorporated into the mold prior to injecting the material mixture, for providing additional balance to the component parts, and improving the performance of the writing instrument described above. As another example, colors may be incorporated in the injection process, by way of example but not limitation, using a colored powdered material prior to preheating the material mixture, or by coating the surfaces of the cavity of the mold with a colored substance, prior to injecting the material mixture.

By way of another example, but not limitation, a ring may be overmolded at a distal end of each of the two handles, thereby creating a loop or aperture for attaching to various articles. This ring may be generally circular in shape, or may take on a variety of different shapes depending on the characteristics of the writing instrument, including the length of each of the handles and the preferences of the individual users. Ring(s) may be overmolded in one or more locations along the handle, and may also be incorporated into the writing utensil portion of the writing instrument, as required for balancing or user preference.

In one alternative embodiment, the handles and/or the writing utensil of the writing instrument may be comprised of a first higher density material, and second a lighter density material, to further achieve proper balancing and weight proportions in the handles and writing utensil portions of the writing instrument. For example, the writing utensil may be formed by molding in two discrete steps: first, by injecting a first material (at a higher density than a second material) into a first portion of the writing utensil; and second, injecting a second lighter density material into a second portion of the writing utensil. Similar steps may be used for injecting different materials into the handles of the writing instrument, in the same fashion described above. Fewer or greater number of injection molding steps to achieve multiple sections with differing densities may also be incorporated without deviating from the general concept discussed in this paragraph.

In yet another alternative embodiment, each handle section may be injected with a cavity within each of the handles, extending in a generally longitudinal direction from a first distal end to a second distal end, for inserting a weight, for achieving proper balancing of the handles and the overall writing instrument. The weighting may be required for a user to perform certain moves, tricks, or flips with the writing instrument, similar to those performed with a butterfly knife. The cavity may be exposed at one distal end, or another distal end, or in another embodiment, may extend less than the entire length of each of the handles. In yet another embodiment, only one of the two handles may include the cavity. In yet another embodiment, the writing utensil portion of the writing instrument may include a cavity, while the handles do not. The handles may be separately formed in two halves to allow a weight to be inserted in between the two halves, if the cavity does not extend to one distal end of the handle or the writing utensil.

Writing utensil may further comprise a substantially hollowed out portion, for inserting a replaceable ink cartridge or other component necessary for replacing the writing element of the writing utensil, such as lead, graphite, or other material suitable for writing.

The writing instrument manufactured according to the various methods described above have several advantages over other manufacturing methods. These manufacturing methods generally produce a sturdy device that may be subject to stresses without causing failure of any of the component parts, including by strain caused to the writing instrument during use, accidental dropping of the writing instrument, as well as repeated use in manipulating the handles of the writing instrument. Material formed by the injection molding process is also more flexible, more difficult to chip or break, and may provide for components of even density throughout the length of each component part, which is important for providing a balanced writing instrument and allowing a user to manipulate easily and quickly the handles of the writing instrument.

The writing instrument according to the manufacturing method described above is also cost effective, may be easily mass produced, and is easy to carry by a user. For example, the materials described herein are generally lightweight, and easy to incorporate in an injection molding process. The component parts of the writing instrument described herein may include multiple parts of equal dimension and design, thereby reducing the number of molds that are necessary to manufacture these parts. Furthermore, this injection molding process will reduce significantly the time necessary to finish the component parts using other methods of manufacture, such as carving, sculpting or tooling these parts.

To provide further clarity to the detailed description provided herein in the associated drawings, the following list of components and associated numbering are provided as follows:

| Component No. | Component |
| --- | --- |
| 2 | Writing Instrument |
| 4 | Writing Utensil |
| 6 | Writing Utensil Forward End |
| 8 | Writing Utensil Distal End |
| 10, 12, 14 | Lateral Surfaces (of Writing Utensil) |
| 20 | Handles |
| 22, 24, 26 | Contours of Handles |
| 30 | Pin |
| 32 | First Portion (of Handle) |
| 34 | Second Portion (of Handle) |
| 36 | Stopping Pin |
| L1 | Longitudinal Length (Writing Utensil) |
| L2 | Longitudinal Length (Handles) |
| 42, 44, 46 | Spacer Elements (of Handles) |
| 48 | Recess (of Handles) |
| 50 | Holes/Slots (of Handles) |

The foregoing description of the present invention has been presented for illustration and description purposes. However, the description is not intended to limit the invention to only the forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Consequently, variations and modifications commensurate with the above teachings and skill and knowledge of the relevant art are within the scope of the present invention. The embodiments described herein above are further intended to explain best modes of practicing the invention and to enable others skilled in the art to utilize the invention in such a manner, or include other embodiments with various modifications as required by the particular application(s) or use(s) of the present invention. Thus, it is intended that the appended claims be construed to include alternative embodiments to the extent permitted by the prior art.

What is claimed is:

1. A method for forming a writing instrument, comprising:
   obtaining a writing utensil having a forward end and a distal end;
   obtaining a mold for forming at least two handles of the writing instrument, said at least two handles each having a first end and a second end;
   injecting a material into said mold;
   sealing said mold;
   cooling said material in said mold to harden said material;
   forming an aperture in said second end of each of said at least two handles and associating a weighted element with said aperture to provide balance to said at least two handles and to assist a user in performing tricks with the writing instrument;
   forming a recess in each of said at least two handles, said recess extending in a generally longitudinal direction from said first end to said second end of each of said at least two handles, said recess configured to receive said writing utensil;
   interconnecting said first end of each of said at least two handles to said distal end of said writing utensil, wherein said first end of each of said at least two handles are rotatably interconnected to said distal end of said writing utensil; and
   incorporating said weighted element into said mold prior to injecting said material and overmolding said weighted element with said material.

2. The method as claimed in claim 1, further comprising injecting a first material at a first density into a first portion of said mold, and then injecting a second material at a second density into a second portion of said mold, wherein said first density is different than said second density, and wherein said at least two handles contain said first material at said first density and said second material at said second density to provide additional weight or balance to said at least two handles.

3. The method as claimed in claim 1, further comprising adding at least one coloring agent in said mold prior to injecting said material into said mold.

4. The method as claimed in claim 1, wherein said material comprises at least one of a plastic, a foaming-type polyurethane, a non-foaming type polyurethane, a polyethylene, a compressible foam, a rubber, a metal, a metal alloy, a wood, a ceramic, and a synthetic material.

5. The method as claimed in claim 1, further comprising texturing or scarring at least one surface of said at least two handles to improve a user's ability to grip and use the writing instrument.

6. The method as claimed in claim 1, further comprising forming a cavity in each of said at least two handles, said cavity extending in a generally longitudinal direction between said first end to said second end of each of said at least two handles, said cavity operatively associated with a weight or other material of higher density than said material for providing proper balancing and weighting of the writing instrument.

7. The method as claimed in claim 1, further comprising sanding, shaving, or polishing at least one of said at least two handles after it has cooled.

8. The method as claimed in claim 6, wherein said cavity is exposed at said second end of each of said at least two handles, and further comprising inserting said weight into said cavity through said exposed second end of each of said at least two handles.

9. The method as claimed in claim 1, wherein obtaining a writing utensil comprises obtaining a mold for forming a writing utensil.

10. The method as claimed in claim 1, wherein said weighted element comprises a ring.

* * * * *